(12) United States Patent
Peterson

(10) Patent No.: US 12,229,756 B2
(45) Date of Patent: *Feb. 18, 2025

(54) SYSTEMS AND METHODS FOR ENCRYPTION AND DECRYPTION SERVICE FOR ELECTRONIC TRANSACTION MONITORING AND REPORTING

(71) Applicant: Worldpay, LLC, Symmes Township, OH (US)

(72) Inventor: Brant Peterson, Denver, CO (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,207

(22) Filed: Jan. 17, 2023

(65) Prior Publication Data

US 2023/0222497 A1 Jul. 13, 2023

Related U.S. Application Data

(63) Continuation of application No. 15/843,548, filed on Dec. 15, 2017, now Pat. No. 11,587,073.

(51) Int. Cl.
*G06Q 20/38* (2012.01)
*G06Q 20/40* (2012.01)
*H04L 9/32* (2006.01)
*G06Q 20/20* (2012.01)

(52) U.S. Cl.
CPC ......... *G06Q 20/382* (2013.01); *G06Q 20/401* (2013.01); *H04L 9/3226* (2013.01); *G06Q 20/206* (2013.01); *G06Q 2220/00* (2013.01); *H04L 2209/56* (2013.01)

(58) Field of Classification Search
None
See application file for complete search history.

(56) References Cited

U.S. PATENT DOCUMENTS 5,351,296 A * 9/1994 Sullivan ............. G06Q 20/4012
379/93.12
5,870,473 A * 2/1999 Boesch ............... H04L 63/0435
380/279

(Continued)

FOREIGN PATENT DOCUMENTS

EP 2642725 A1 * 9/2013 ............. H04L 47/28
WO WO-03058879 A1 * 7/2003 ............. H04L 51/38

OTHER PUBLICATIONS

T. Menzies and A. Marcus, "Automated severity assessment of software defect reports," 2008 IEEE International Conference on Software Maintenance, 2008, pp. 346-355, doi: 10.1109/ICSM.2008.4658083. (Year: 2008).

*Primary Examiner* — Neha Patel
*Assistant Examiner* — Jahed Ali
(74) *Attorney, Agent, or Firm* — Bookoff McAndrews, PLLC

(57) ABSTRACT

A method for electronic transaction monitoring and reporting includes: determining whether the received transaction request is encrypted, upon determining that the received transaction request is not encrypted, sending a failure alert to the merchant, determining a receiving acquirer processor for the transaction request, and transmitting the transaction request to the determined acquirer processor.

20 Claims, 10 Drawing Sheets

(56) References Cited

U.S. PATENT DOCUMENTS

| | | | | |
|---|---|---|---|---|
| 6,832,314 B1* | 12/2004 | Irvin | H04W 12/037 | 713/168 |
| 7,292,587 B2* | 11/2007 | Knauerhase | H04W 88/06 | 370/428 |
| 8,590,057 B1* | 11/2013 | Mayblum | H04L 63/0428 | 726/28 |
| 9,373,111 B2* | 6/2016 | Wagner | G06Q 20/40 | |
| 9,818,108 B2* | 11/2017 | Von Mueller | G06Q 20/3823 | |
| 10,673,617 B1* | 6/2020 | Antoniou | G06F 13/4282 | |
| 2002/0055837 A1* | 5/2002 | Ahonen | G10L 19/005 | 704/228 |
| 2002/0091718 A1* | 7/2002 | Bohannon | G06F 11/1474 | |
| 2004/0225748 A1* | 11/2004 | Chong | H04L 69/22 | 709/236 |
| 2005/0071434 A1* | 3/2005 | Hettish | H04L 51/066 | 709/207 |
| 2005/0102525 A1* | 5/2005 | Akimoto | H04L 63/0236 | 713/187 |
| 2005/0273843 A1* | 12/2005 | Shigeeda | H04L 63/0807 | 726/5 |
| 2007/0116266 A1* | 5/2007 | Greco | H04L 9/3236 | 380/28 |
| 2008/0103800 A1* | 5/2008 | Domenikos | G06Q 40/02 | 705/318 |
| 2008/0129037 A1* | 6/2008 | Roth | G06Q 20/382 | 705/64 |
| 2009/0300368 A1* | 12/2009 | Zilberstein | G06F 21/83 | 713/190 |
| 2010/0011254 A1* | 1/2010 | Votta | G06F 11/008 | 714/47.2 |
| 2010/0318468 A1* | 12/2010 | Carr | G06Q 20/40 | 705/79 |
| 2010/0322417 A1* | 12/2010 | Altmann | H04N 21/435 | 380/42 |
| 2011/0047230 A1* | 2/2011 | McGee | H04L 41/12 | 709/217 |
| 2011/0077977 A1* | 3/2011 | Collins | G06Q 40/08 | 707/755 |
| 2011/0211689 A1* | 9/2011 | Von Mueller | G06Q 20/3823 | 380/28 |
| 2012/0158585 A1* | 6/2012 | Ganti | G06Q 20/40 | 705/44 |
| 2012/0271955 A1* | 10/2012 | Deverick | H04L 67/104 | 709/227 |
| 2012/0275598 A1* | 11/2012 | Vimpari | H04L 9/0872 | 380/255 |
| 2013/0041823 A1* | 2/2013 | Wagner | G06Q 20/382 | 705/44 |
| 2013/0067032 A1* | 3/2013 | Kasim | G06Q 20/355 | 709/217 |
| 2013/0212026 A1* | 8/2013 | Powell | H04L 9/0894 | 705/76 |
| 2013/0291089 A1* | 10/2013 | Wang | H04L 67/289 | 726/14 |
| 2013/0297392 A1* | 11/2013 | Cincera | G06Q 30/02 | 705/14.25 |
| 2013/0341977 A1* | 12/2013 | Kiefer | B60N 2/976 | 297/217.3 |
| 2014/0052642 A1* | 2/2014 | Spies | G06Q 20/20 | 705/64 |
| 2014/0146648 A1* | 5/2014 | Alber | G11B 27/105 | 369/53.1 |
| 2014/0146650 A1* | 5/2014 | Alber | G11B 27/34 | 369/53.41 |
| 2014/0149477 A1* | 5/2014 | Abramovitz | G06F 16/1824 | 707/827 |
| 2014/0281487 A1* | 9/2014 | Klausen | H04L 63/04 | 713/153 |
| 2014/0324278 A1* | 10/2014 | Teng | G06Q 50/30 | 701/31.5 |
| 2015/0019443 A1* | 1/2015 | Sheets | G06Q 20/322 | 705/71 |
| 2015/0170148 A1* | 6/2015 | Priebatsch | G06Q 20/386 | 705/44 |
| 2015/0271150 A1* | 9/2015 | Barnett | G06F 21/6227 | 713/171 |
| 2015/0302397 A1* | 10/2015 | Kalgi | G06Q 20/3829 | 705/65 |
| 2015/0313534 A1* | 11/2015 | Angelides | A61B 5/4833 | 600/301 |
| 2016/0155122 A1* | 6/2016 | Patterson | G06Q 20/40 | 705/44 |
| 2016/0318622 A1* | 11/2016 | Haukom | G07C 5/0808 | |
| 2016/0373412 A1* | 12/2016 | MacCarthaigh | H04L 63/0428 | |
| 2017/0004496 A1* | 1/2017 | Pujari | G06Q 20/3829 | |
| 2017/0101054 A1* | 4/2017 | Dusane | G08G 1/096741 | |
| 2017/0132929 A1* | 5/2017 | Mays | G08G 1/096725 | |
| 2017/0291544 A1* | 10/2017 | Ishihara | G06F 3/013 | |
| 2017/0337399 A1* | 11/2017 | Alonzo | H04W 12/02 | |
| 2018/0253705 A1* | 9/2018 | Spector | G06Q 20/102 | |
| 2018/0314965 A1* | 11/2018 | Dodson | G06N 20/00 | |
| 2019/0139039 A1* | 5/2019 | Chawan | G06Q 20/38215 | |
| 2020/0066383 A1* | 2/2020 | Rutledge | G16H 80/00 | |
| 2020/0334923 A1* | 10/2020 | Yamamoto | B60Q 9/00 | |
| 2020/0336506 A1* | 10/2020 | Levin | G06F 40/30 | |
| 2021/0090730 A1* | 3/2021 | Patel | G16H 80/00 | |
| 2022/0182278 A1* | 6/2022 | Vangapalli | H04L 41/0631 | |

* cited by examiner

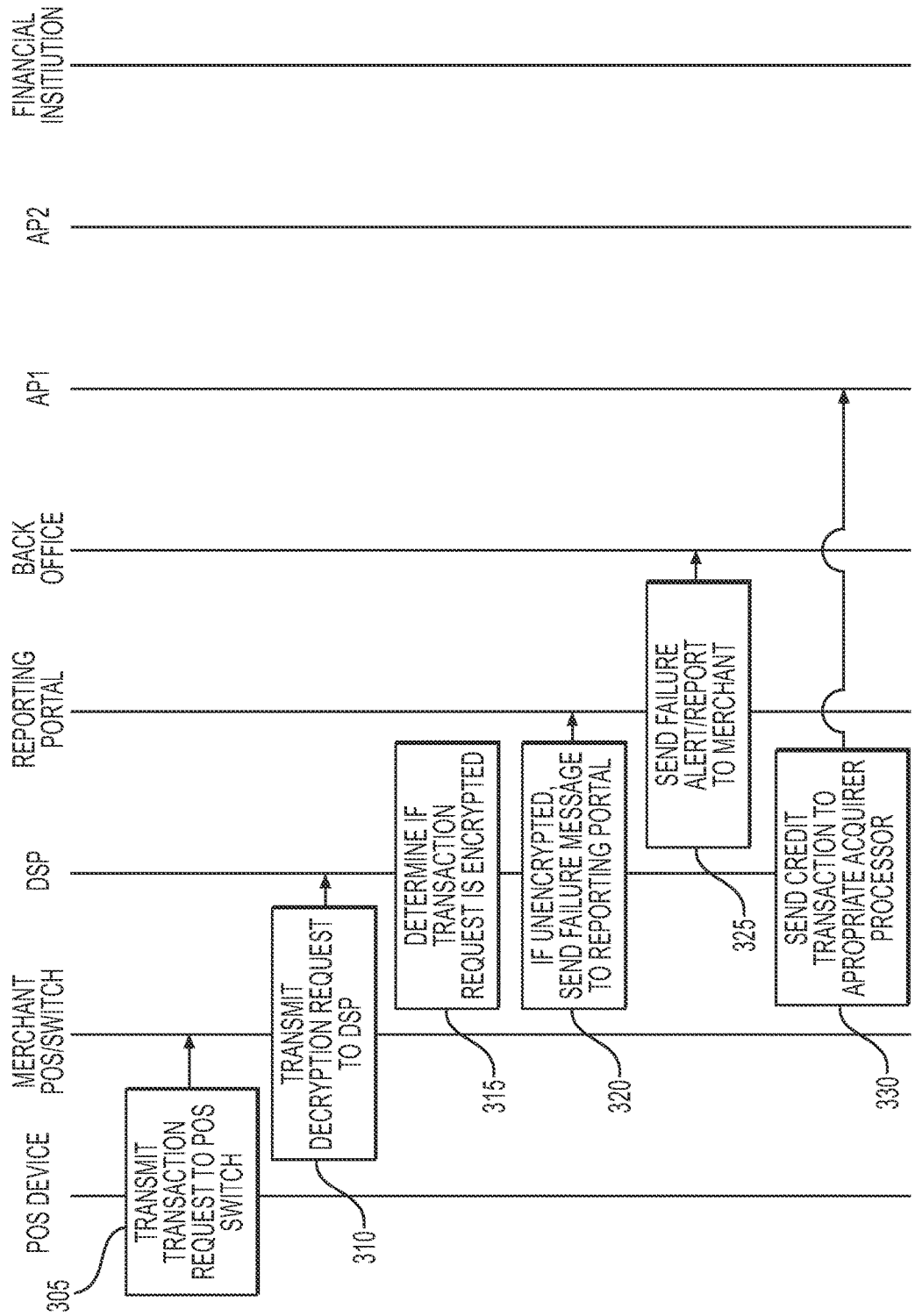

| P2PE FAILURES | |
|---|---|
| Q P2PE FAILURES SEARCH | |

| PLEASE SELECT | ENTER A VALUE OR CLICK + TO LOOK UP | FROM DATE | TO DATE | |
|---|---|---|---|---|
| CHAIN ⌄ | 000294  ⊕  + | 01/15/2017 📅 | 01/15/2017 📅 | SEARCH |

ADDITIONAL CRITERIA
FAILURE CODE
ALL ⌄

*FIG. 5B*

| TOTAL FAILURES | 1-DECRYPTION NOT POSSIBLE - MERCHANT MESSAGE RELATED | 2-DECRYPTION NOT POSSIBLE - VANTIV INTERNAL ISSUE | 3-DECRYPTION FAILED | 4-MALFORMED MESSAGE RECEIVED | 5-CLEAR DATA RECEIVED | 6-INVALID CARD - POSSIBLE DECRYPTION ATTEMPT FAILURE |
|---|---|---|---|---|---|---|
| 47 | 0 | 0 | 44 | 0 | 3 | 0 |

P2PE FAILURES

47 RESULTS    MORE TIPS | SHOW OR HIDE COLUMNS

| TRANSACTION DATE | TRANSACTION TIME | FAILURE CODE | CHAIN CODE | DIVISION | STORE | MERCHANT NUMBER | CARD NUMBER | CARD TYPE |
|---|---|---|---|---|---|---|---|---|
| 01/10/2017 | 18:52:20 | 3 | 000294 | 000 | 000091 | 4445091119263 | | |
| 01/11/2017 | 15:48:38 | 3 | 000294 | 000 | 000091 | 4445002007773 | 6102969000005504 | |
| 01/11/2017 | 15:18:17 | 3 | 000294 | 000 | 000091 | 4445091119396 | 5413330089099049 | |
| 01/11/2017 | 14:35:49 | 3 | 000294 | 000 | 000091 | 4445091119396 | 6360070010040725 | |
| 01/11/2017 | 16:12:46 | 3 | 000294 | 000 | 000091 | 4445091119263 | 4761739001012222 | |
| 01/11/2017 | 16:05:09 | 3 | 000294 | 000 | 000091 | 4445091119263 | 3411150727200 | |
| 01/11/2017 | 15:47:53 | 3 | 000294 | 000 | 000091 | 4445091119263 | 3742450172100 | |
| 01/11/2017 | 15:39:25 | 3 | 000294 | 000 | 000091 | 4445091119263 | 3742450172100 | |
| 01/11/2017 | 11:27:03 | 3 | 000294 | 000 | 000091 | 4445091119263 | | |
| 01/11/2017 | 05:10:47 | 3 | 000294 | 000 | 000091 | 4445091119263 | | |
| 01/11/2017 | 14:48:10 | 3 | 000294 | 000 | 000091 | 4445002007773 | 4445222299990007 | |
| 01/11/2017 | 14:54:13 | 3 | 000294 | 000 | 000091 | 4445002007773 | 6011009909111111 | |
| 01/11/2017 | 14:15:02 | 3 | 000294 | 000 | 000091 | 4445002007773 | 9999999800000090 | |
| 01/11/2017 | 14:26:21 | 3 | 000294 | 000 | 000091 | 4445002007773 | 3411159724200 | |
| 01/11/2017 | 14:27:18 | 3 | 000294 | 000 | 000091 | 4445002007773 | 9999999812000005 | |

*FIG. 5C*

SYSTEMS AND METHODS FOR ENCRYPTION AND DECRYPTION SERVICE FOR ELECTRONIC TRANSACTION MONITORING AND REPORTING

CROSS-REFERENCE TO RELATED APPLICATION(S)

This patent application is a continuation of and claims the benefit of priority to U.S. Nonprovisional patent application Ser. No. 15/843,548, filed on Dec. 15, 2017, the entirety of which is incorporated herein by reference.

TECHNICAL FIELD

Various embodiments of the present disclosure relate generally to the field of electronic transaction processing and, more particularly, to encryption and decryption services for electronic transaction messages.

BACKGROUND

Processing of electronic transactions typically involves the transmission of electronic transaction request messages across computer networks from a merchant to an acquirer processor and to a financial institution. In order to protect sensitive consumer information contained in the electronic transaction request message, such messages are typically encrypted. Merchants, acquirer processors, and financial institutions seeking assurances that the encryption applied to an electronic transaction request message is robust may rely on a previously validated encryption solution, such as a point-to-point encryption (P2PE) solution validated through the Payment Card Industry (PCI) Security Standards.

Such a P2PE solution provides significant value to merchants as it may eliminate the risk of payment card data compromise within a merchant's retail environment. However, the benefits of P2PE are only realized if a P2PE solution is properly implemented. Good technologies implemented poorly may result in a false sense of security. Point of interaction (POI) devices that do not encrypt data and send unencrypted, or "clear," data to their acquirer processor may present a data breach risk to merchants.

Many such breaches occur over days or months before being detected. If critical security control failures alerts are not quickly and effectively responded to, attackers may use this time to insert malicious software, gain control of a system, or steal data from the merchant's, acquirer processor's, or financial institution's environment. The ability to quickly detect an incident is beneficial for protection of a merchant's assets and brand reputation. However, merchants may lack the technical expertise or infrastructure to prove the preventative measures are working, or to detect an encryption failure in, for example, the merchant's point of sale (POS) systems. Thus, merchants may wish to implement a security policy that meets these challenges but may not have the resources or capabilities to support real-time event detection.

In addition, in order to achieve a PCI P2PE Validated Solution, a service provider must implement alerting and detection controls for the merchants using their services. Service providers may wish to offer a P2PE validated solution, but either cannot be eligible because of deficiencies in their decryption environment or because they lack the resources to build their own monitoring, reporting, as alerting solution.

The present disclosure is directed to overcoming one or more of these above-referenced challenges.

SUMMARY OF THE DISCLOSURE

According to certain aspects of the disclosure, systems and methods are disclosed for electronic transaction monitoring and reporting.

According to certain aspects of the present disclosure, systems and methods are disclosed for optimizing transaction authorization conversion rates.

In one embodiment, a computer-implemented method is disclosed for electronic transaction monitoring and reporting. The method includes: receiving a transaction request from a merchant over a computer network, determining, using one or more processors, whether the received transaction request is encrypted, upon determining that the received transaction request is not encrypted, sending a failure alert to the merchant, determining a receiving acquirer processor for the transaction request, and transmitting the transaction request to the determined acquirer processor over a computer network.

In accordance with another embodiment, a system is disclosed for electronic transaction monitoring and reporting. The system comprises: a data storage device storing instructions for electronic transaction monitoring and reporting in an electronic storage medium, and a processor configured to execute the instructions to perform a method including: receiving a transaction request from a merchant over a computer network, determining, using one or more processors, whether the received transaction request is encrypted, upon determining that the received transaction request is not encrypted, sending a failure alert to the merchant, determining a receiving acquirer processor for the transaction request, and transmitting the transaction request to the determined acquirer processor over a computer network.

In accordance with another embodiment, a non-transitory machine-readable medium is disclosed that stores instructions that, when executed by a computer, cause the computer to perform a method for electronic transaction monitoring and reporting. The method includes: receiving a transaction request from a merchant over a computer network, determining, using one or more processors, whether the received transaction request is encrypted, upon determining that the received transaction request is not encrypted, sending a failure alert to the merchant, determining a receiving acquirer processor for the transaction request, and transmitting the transaction request to the determined acquirer processor over a computer network.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 3A-3C depict a message flow in an example process for electronic transaction monitoring and reporting, according to one or more embodiments.

FIG. 5B is a screenshot of an exemplary graphical user interface (GUI) depicting electronic transaction alert search GUI in an example system for electronic transaction monitoring and reporting for an exemplary merchant.

FIG. 5C is a screenshot of an exemplary graphical user interface (GUI) depicting a point-to-point encryption (P2PE) failure report for an exemplary merchant.

DETAILED DESCRIPTION OF EMBODIMENTS

Various embodiments of the present disclosure relate generally to enabling voice control of an interactive audiovisual environment, and monitoring user behavior to assess engagement.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1:
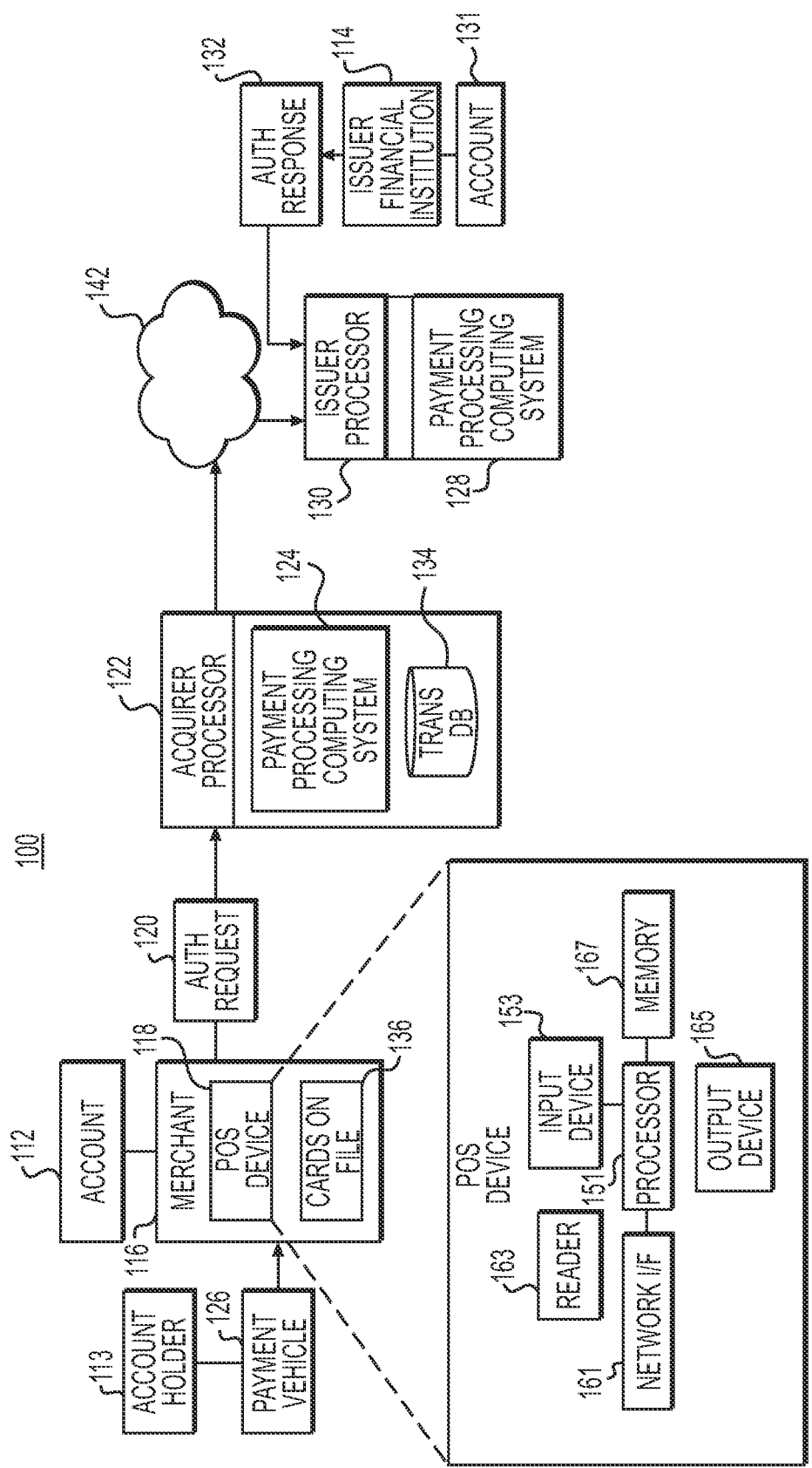
FIG. 1 depicts a block diagram of an example payment system and network in which electronic transaction monitoring and reporting may be performed, according to one or more embodiments.

Any suitable system infrastructure may be put into place to allow user control of an interactive audiovisual environment, and engagement assessment. FIG. 1 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 1. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones, dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

As described above, merchants, acquirer processors, and financial institutions seek assurances that encryption applied to an electronic transaction request message is robust. Thus, the embodiments of the present disclosure are directed to providing an encryption monitoring and reporting service to validate the encryption of electronic transaction request message and to alert a merchant of encryption failures in transaction request messages.

In accordance with one or more embodiments, and as described in more detail below, a decryption service provider may detect the transmission of unencrypted transaction messages or other encryption failures in encrypted transaction messages and provide a failure or error reports to a merchant. Such failure or error reports may be provided through a reporting or alerting portal accessible to the merchant over a computer network.

One or more examples of these non-limiting embodiments are illustrated in the selected examples disclosed and described in detail with reference to FIGS. 1-6 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

FIG. 1 depicts a block diagram of an example payment environment 100 for optimizing transaction authorization conversion rates. In the example payment environment 100, a payment vehicle 126 (e.g., a credit card) may be issued to an account holder 113 by an issuer financial institution 114. Issuer financial institution 114 may be any of a variety of financial institutions that is capable of issuing a payment vehicle to an account holder. Payment vehicle 126 may be used to pay a merchant 116 for a purchase transaction at a merchant point of sale (POS) device 118. Merchant POS device 118 may be any device that facilitates receipt of a payment vehicle for payment of a purchase, such as for example, a POS terminal or a web interface. Further, merchant 116 may be any type of merchant or service provider, such as, for example, a brick-and-mortar merchant, an online merchant, a mobile merchant, a kiosk, or any other type of merchant or device configured to receive payment cards, or electronic or mobile wallets, from account holders as a form of payment.

POS device 118 may be configured to interact with payment vehicle 126 to obtain account information about a consumer account affiliated with account holder 113. As shown in the depicted callout of POS device 118, in one or more embodiments, POS device 118 may include a memory 167 coupled to processor 151, which may control the operations of a reader 163, an input device 153, an output device 165, and a network interface 161. Memory 167 may store instructions for processor 151 and/or data, such as, for example, an identifier that is associated with merchant account 112.

In one or more embodiments, reader 163 may include a magnetic strip reader. In one or more embodiments, reader 163 may include a contactless reader, such as, for example, a radio frequency identification (RFID) reader, a near field communications (NFC) device configured to read data via magnetic field coupling (in accordance with ISO standard 14443/NFC), a Bluetooth transceiver, a Wi-Fi transceiver, an infrared transceiver, a laser scanner, and so forth.

In one or more embodiments, input device 153 may include key buttons that may be used to enter the account information directly into POS device 118 without the physical presence of payment vehicle 126. Input device 153 may be configured to provide further information to initiate a transaction, such as, for example, a personal identification number (PIN), password, zip code, etc., or in combination with the account information obtained from payment vehicle 126. In one or more embodiments, output device 165 may include a display, a speaker, and/or a printer to present information, such as, for example, the result of an authorization request, a receipt for the transaction, an advertisement, and so forth.

In one or more embodiments, network interface 161 may be configured to communicate with acquirer processor 122 such as, for example, via a telephone connection, an Internet connection, or a dedicated data communication channel.

In one or more embodiments, the instructions stored in memory 167 may be configured at least to cause POS device 118 to send an authorization request message to acquirer processor 122 to initiate a transaction. POS device 118 may or may not send a separate request for the clearing and settling of the transaction. The instructions stored in memory 167 also may be configured to cause POS device 118 to perform other types of functions discussed in this description.

In one or more embodiments, POS device 118 may have fewer components than those illustrated in FIG. 1. For example, in one or more embodiments, POS device 118 may be configured for "card-not-present" transactions; and POS device 118 may not have a reader 163. In one or more embodiments, POS device 118 may have more components than those illustrated in FIG. 1.

During a purchase event, merchant POS device 118 may send an authorization request 120 for the purchase transaction to acquirer processor 122 that processes payment vehicle transactions for merchant 116. Additional intermediary entities, such as one or more payment gateways, may assist with the handling and routing of authorization request 120 or other related messaging. For the purposes of illustration, such intermediary entities may be considered part of acquirer processor 122. Authorization request 120 may include identifying information from payment vehicle 126, such as a BIN number, an expiration date, and a first and last name of the account holder, for example. Authorization request 120 may further include identifying information from the purchase, such as an amount and identifying information from merchant POS device 118 and/or merchant 116, for example.

In one or more embodiments, payment vehicle 126 may be used to establish a recurring billing arrangement between account holder 113 and merchant 116. An initial transaction may allow merchant 116 to store account information that may be used for subsequent billing events. The account information may be stored in a cards-on-file storage 136. For example, the purchase event illustrated in FIG. 1 may be associated with a subscription, membership plan, installment payment plan between merchant 116 and account holder 113, and so on. For subsequent transactions, merchant 116 may access cards-on-file storage 136 to retrieve the relevant account information. The subsequent transactions may not require direct involvement from account holder 113. In one or more embodiments, account holder 113 may trigger the subsequent transaction, but may not provide payment vehicle 126 to merchant 116, as merchant 116 may access the cardholder's account information in cards-on-file storage 136.

A payment processing computing system 124 at acquirer processor 122 may receive authorization request 120 from merchant 116. Payment processing computing system 124 may translate authorization request 120, if necessary, and may provide authorization request 120 to a payment network 142. Payment network 142 may be, for example, a network of a credit card association affiliated with payment vehicle 126. Nonlimiting examples of credit card associations include VISA, MASTERCARD, DISCOVER, and AMERICAN EXPRESS, and so on. Authorization request 120 then may be provided to a payment processing computing system 128 at an issuer processor 130. In response to receiving the authorization request, and based on the type of payment vehicle 126, payment processing computing system 128 may provide authorization request 120 to issuer financial institution 114. Using information from authorization request 120, issuer financial institution 114 may associate the purchase transaction with an account 131 of account holder 113 held by issuer financial institution 114. Issuer financial institution 114 then may send an authorization response 132 which may either approve or deny the transaction. Authorization response 132 may be provided to payment processing computing system 128 at issuer processor 130 and then provided to payment network 142. Authorization response 132 then may be provided to payment processing computing system 124 at acquirer processor 122. Upon receiving authorization response 132, payment processing computing system 124 may send either an approval message or a denial message to merchant POS device 118 to complete the purchase transaction. If the purchase transaction is approved, it may be posted to account holder's account 131 and reconciled later with account holder 113 and merchant 116.

Transaction records may be stored in one or more locations within system 100. In one or more embodiments, the transaction record may be stored within a transaction data database 134 of acquirer processor 122. The transaction data may be received by transaction data database 134 from various sources, such as merchant POS device 118, merchant 116, acquirer processor 122, and so on. A plurality of transaction parameters associated with the purchase transaction may be stored in each transaction record, which may generally be used for settlement and financial recordkeeping. While the transaction parameters stored in each transaction record may vary, example transaction parameters may include, without limitation, account number, card number, payment vehicle information, product information (such as product type, product serial number, and so forth), transaction amount, loyalty account information, merchant information, transaction amount, response code, transaction date, transaction time, whether the transaction was a "card present" transaction, and so on.

Figure 2:
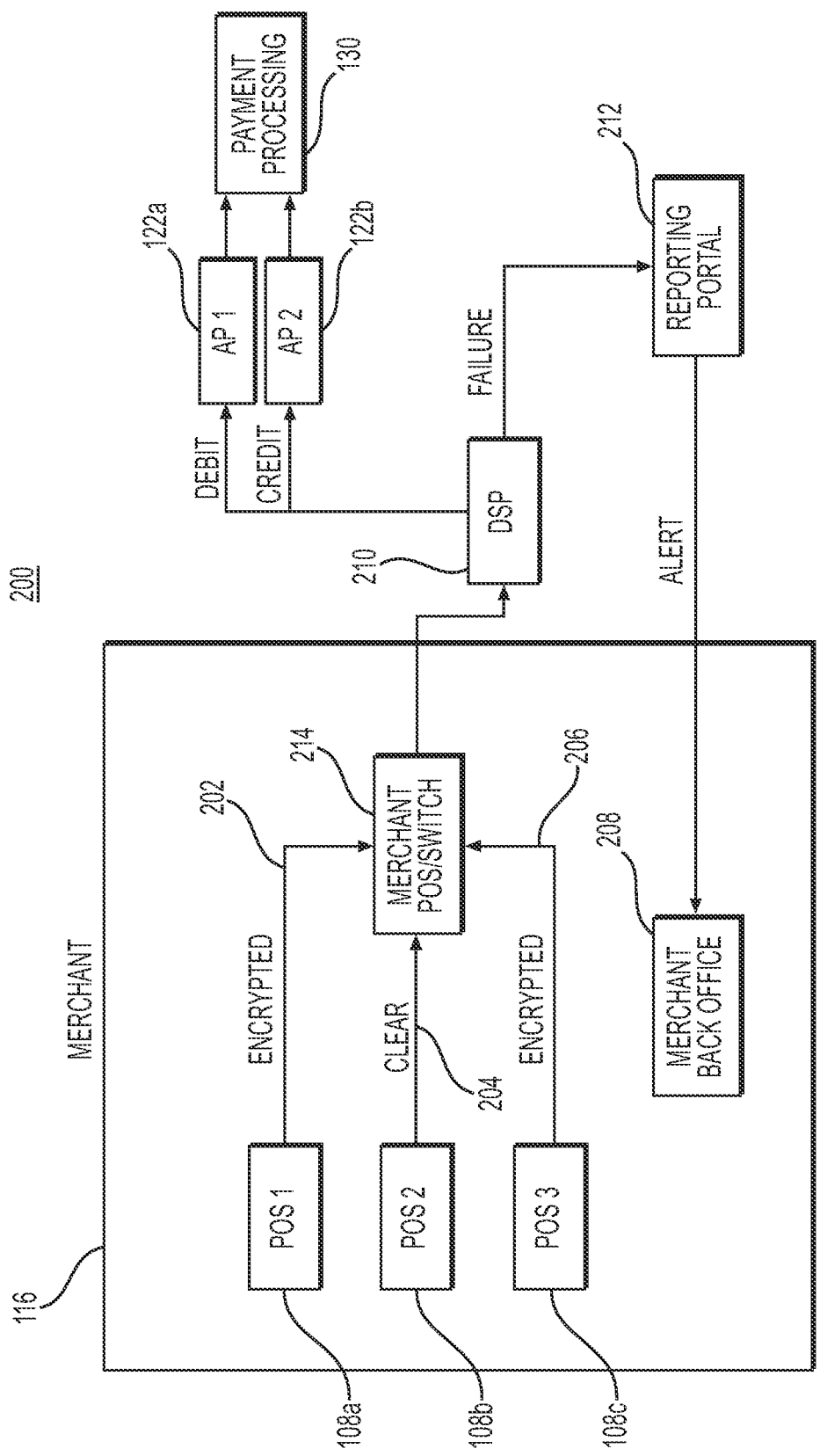
FIG. 2 depicts a block diagram of an example system and process flow for electronic transaction monitoring and reporting, according to one or more embodiments.

FIG. 2 depicts a block diagram of an example system and process flow for electronic transaction monitoring and reporting, according to one or more embodiments. As shown in FIG. 2, a merchant environment, such as that of merchant 116 depicted in FIG. 1, may include one or more point of sale (POS) devices, such as POS device 118 depicted in FIG. 1. Each POS device may transmit a transaction request message to a POS/switch in the merchant environment, such as POS/switch 214 depicted in FIG. 2, for internal processing before being forwarded out of the merchant environment for processing. Each transaction request message may be transmitted as encrypted or clear data. For example, POS 1 (118*a*) may transmit encrypted transaction request message 202, POS 2 (118*b*) may transmit transaction request message 204 as clear data, and POS 3 (118*c*) may transmit encrypted transaction request message 206. The POS/switch may perform internal processing on the transaction request message before transmitting the transaction request message to a decryption service provider (DSP) 210. DSP 210 may receive the transaction request message through an application programming interface (API) published by DSP 210 and accessible to the POS/switch by way of a computer network, which may be, for example, a local area network (LAN), a wide area network, the Internet, or a cloud-based network. The network may be wired, such as an Ethernet network, or wireless, such as Wi-Fi. The API published by the DSP may be independent of any API for any acquirer processor, or of any P2PE schema employed by merchants or acquirer processors. This may allow DSP 210 greater flexibility and efficiency in providing services for multiple merchants and multiple acquirer processors. Upon receiving the transaction request message, DSP 210 may attempt to decrypt the transaction request message, and may detect errors in the transaction request message. For example, DSP 210 may detect that the transaction request message is not encrypted, or that the transaction request message is malformed, such as having been corrupted during transmission, or that a decryption failure has occurred, such as when the transaction request message is encrypted by an encryption key not matching a registered decryption key associated with the merchant, or that the transaction request message cannot be decrypted, either because of an error in the transaction request message or because an internal processing error within DSP 210. If any errors are detected, then DSP 210 may transmit a failure report to a reporting portal, such as reporting portal 212 depicted in FIG. 3. Reporting portal 212 may store each failure report such that it may be transmitted to, or requested by, a merchant or other entity having access to reporting data for the merchant. For example, each failure report may be stored in a database that may be searched by a query submitted by a merchant or other entity having access to reporting data for the merchant. Reporting portal 212 may provide a user interface for searching and viewing failure reports, such as will be described below with respect to FIGS. 5A-5C. Failure alert reports may be provided to the merchant, such as by way of a merchant back office 208, on demand from merchant back office 208 or on a regularly recurring schedule, such as, for example, daily weekly, monthly, upon the accumulation a predetermined number of failure reports, or upon the accumulation a predetermined number of failure reports of a predetermined severity level, etc. For example, a failure of transmitting clear data may be deemed have a high severity level and may be reported more frequently than transmission failures that merely require retransmission of the transaction request message. If any errors are detected, then DSP 210 may take further action with respect the transaction request message including, for example, returning a message to the POS/switch indicating that the transaction request message failed and could not be processed. DSP 210 may be configured to not provide any payment processing services for the transaction request message. However, DSP 210 may transmit the transaction request message to an appropriate acquirer processor (AP) for further processing, such as acquirer processor 122 depicted in FIG. 1. For example, DSP 210 may transmit debit transaction request messages to AP 1 (122*a*) and credit transaction request messages to AP 2 (122*b*). Transmitting the transaction request message to an AP may include re-encrypting the transaction request message prior to transmission. Such re-encryption may be done using an encryption key associated with the merchant, the DSP, or the AP. Each acquirer processor 122 may, in turn, transmit the transaction request message to payment processing function of an issuer processor, such as issuer processor 130 depicted in FIG. 1.

Figure 3B:
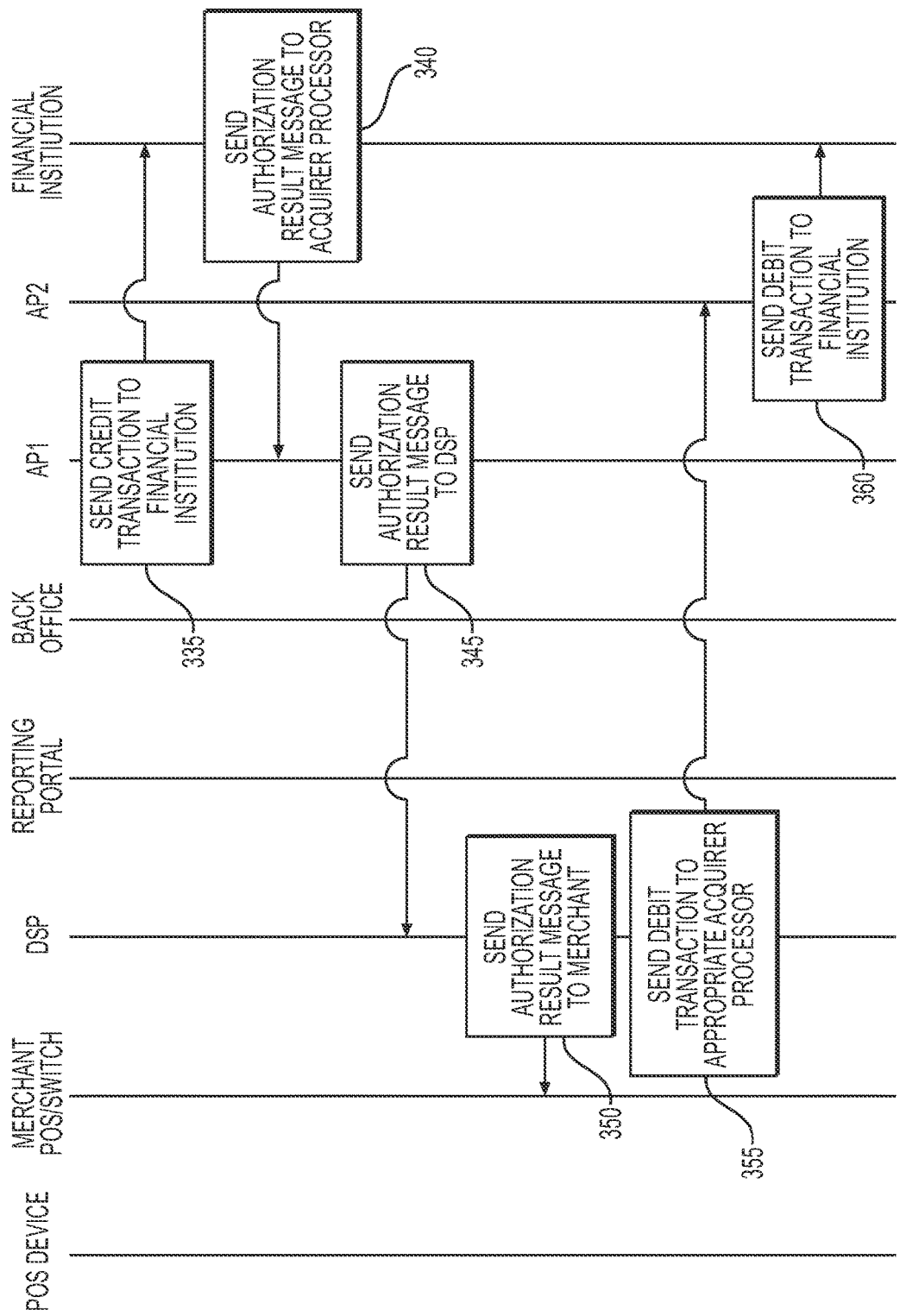
Figure 3C:
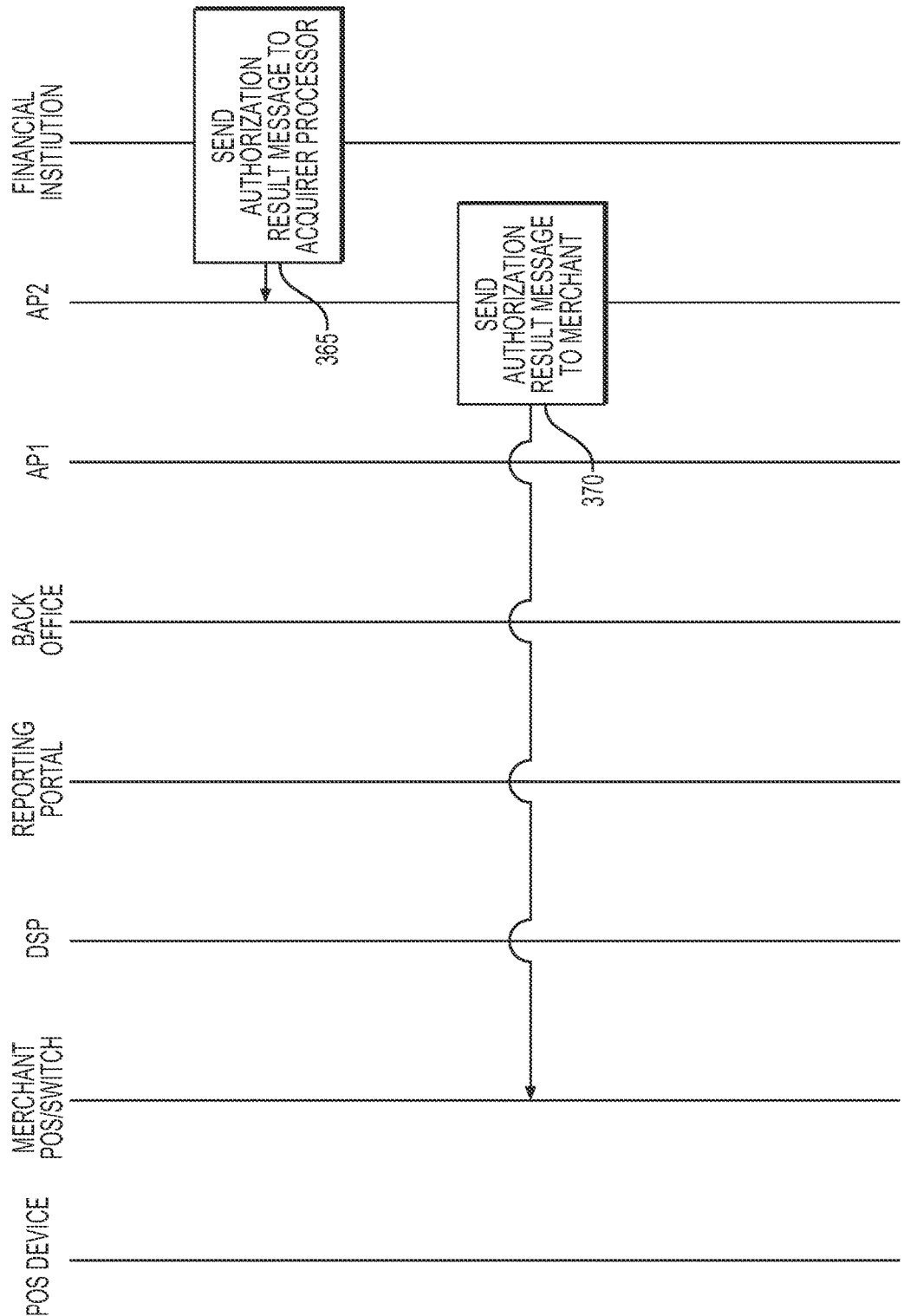

FIGS. 3A-3C depict a message flow in an example process for electronic transaction monitoring and reporting, according to one or more embodiments. As shown in FIG. 3, at operation 305, a POS device operating in a merchant environment, such as POS device 118 operating in the environment of merchant 116, as depicted in FIG. 1, may transmit a transaction request message to a merchant POS/switch, such as POS/switch 214 depicted in FIG. 2, for further processing. At operation 310, the merchant POS/switch may transmit a decryption request for the transaction request message to a decryption service provider (DSP), such as DSP 210 depicted in FIG. 2. At operation 315, the DSP may detect failures or errors in the transaction request message, such as by determining if transaction request is encrypted. At operation 320, if errors are detected, such as if the transaction request message is unencrypted, the DSP may send a failure message to a reporting portal, such as reporting portal 212 depicted in FIG. 2. At operation 325, the reporting portal may send failure alert/report to a back office of the merchant, such as merchant back office 208 depicted in FIG. 2. Failure alert reports may be provided to the merchant, such as by way of a merchant back office 208, on demand from merchant back office 208 or on a regularly recurring schedule, such as, for example, daily weekly, monthly, upon the accumulation a predetermined number of failure reports, or upon the accumulation a predetermined number of failure reports of a predetermined severity level, etc. At operation 330, the DSP may send a transaction request message for a credit transaction to an appropriate acquirer processor, such as acquirer processor 1 depicted in FIG. 2. At operation 335, acquirer processor 1 may send the transaction request message for the credit transaction to a financial institution, such as financial institution 130 depicted in FIG. 1, for authorization and payment. At operation 340, the financial institution may send an authorization result message to acquirer processor 1, and at operation 345, acquirer processor 1 may send the authorization result message to the DSP. At operation 350, the DSP may send the authorization result message to the merchant. At operation 355, DSP may send a transaction request message for a debit transaction to an appropriate acquirer processor, such as acquirer processor 2 depicted in FIG. 2. At operation 360, acquirer processor 2 may send the transaction request message for the debit transaction to a financial institution, such as financial institution 130 depicted in FIG. 1, for authorization and payment. At operation 365, the financial institution may send an authorization result message to acquirer processor 2, and at operation 370, acquirer processor 2 may send the authorization result message to the merchant.

Figure 4:
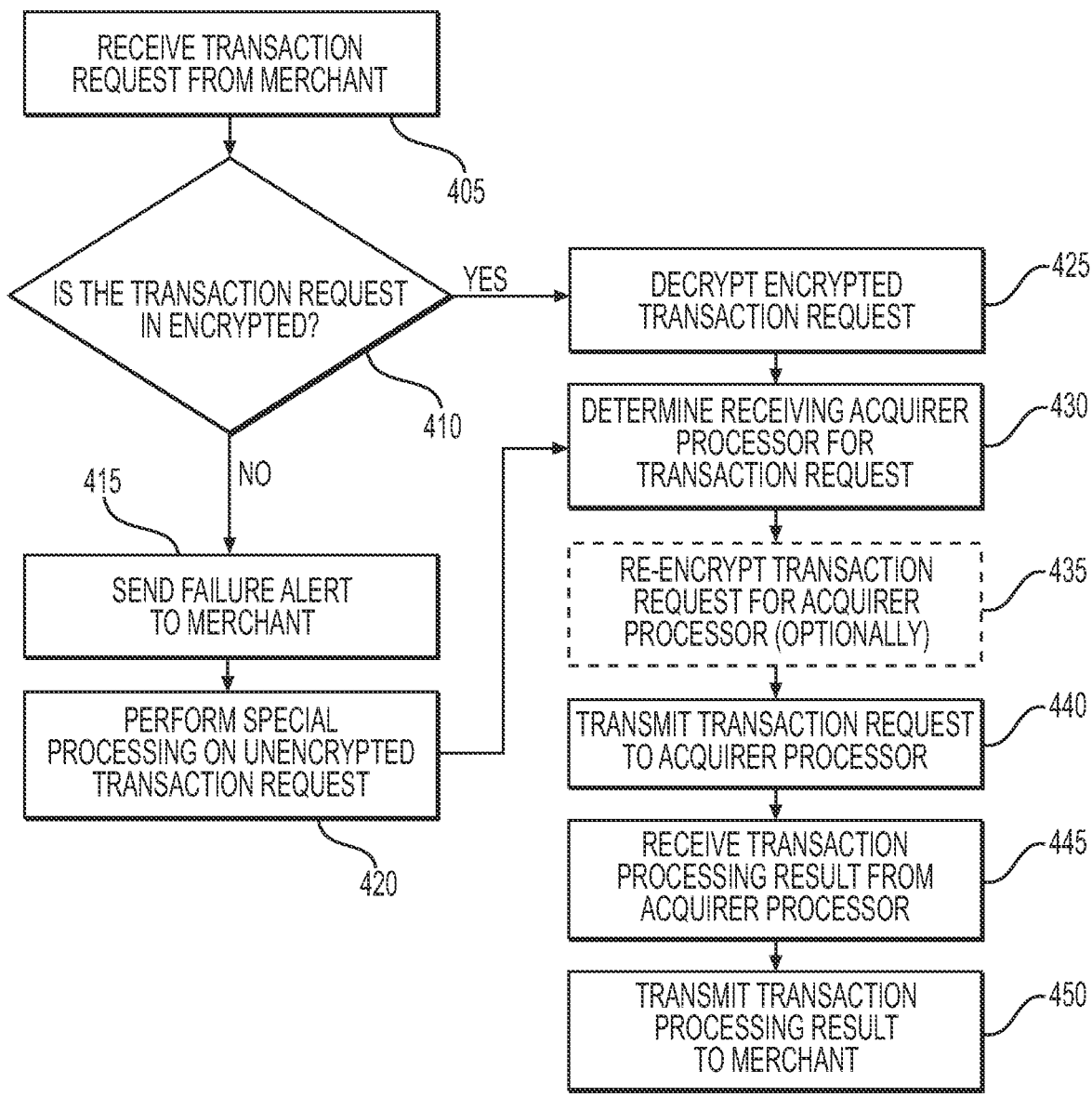
FIG. 4 is a flow chart depicting an example process for electronic transaction monitoring and reporting, according to one or more embodiments.

FIG. 4 is a flow chart depicting an example process for electronic transaction monitoring and reporting, according to one or more embodiments. As shown in FIG. 4, at operation 405, a decryption service provider (DSP), such as DSP 210 depicted in FIG. 2, may receive transaction request from a merchant, such as merchant 116 depicted in FIG. 1. At operation 410, the DSP may determine if the transaction request is encrypted. If the DSP determines that the transaction request is not encrypted, then the DSP may perform additional operations, including operation 415 to send a failure alert to the merchant and operation 420 to perform special processing on the unencrypted transaction request. If the DSP determines that the transaction request is encrypted, then the DSP may, at operation 425, decrypt encrypted transaction request. At operation 430, the DSP may determine an appropriate receiving Acquirer Processor for the transaction request. At operation 435, the DSP may optionally re-encrypt transaction request as needed by the determined Acquirer Processor. At operation 440, the DSP may transmit the transaction request to the determined Acquirer Processor. At operation 445, the DSP may receive a transaction processing result from the Acquirer Processor. At operation 450, the DSP may transmit the transaction processing result to the merchant.

Figure 5A:
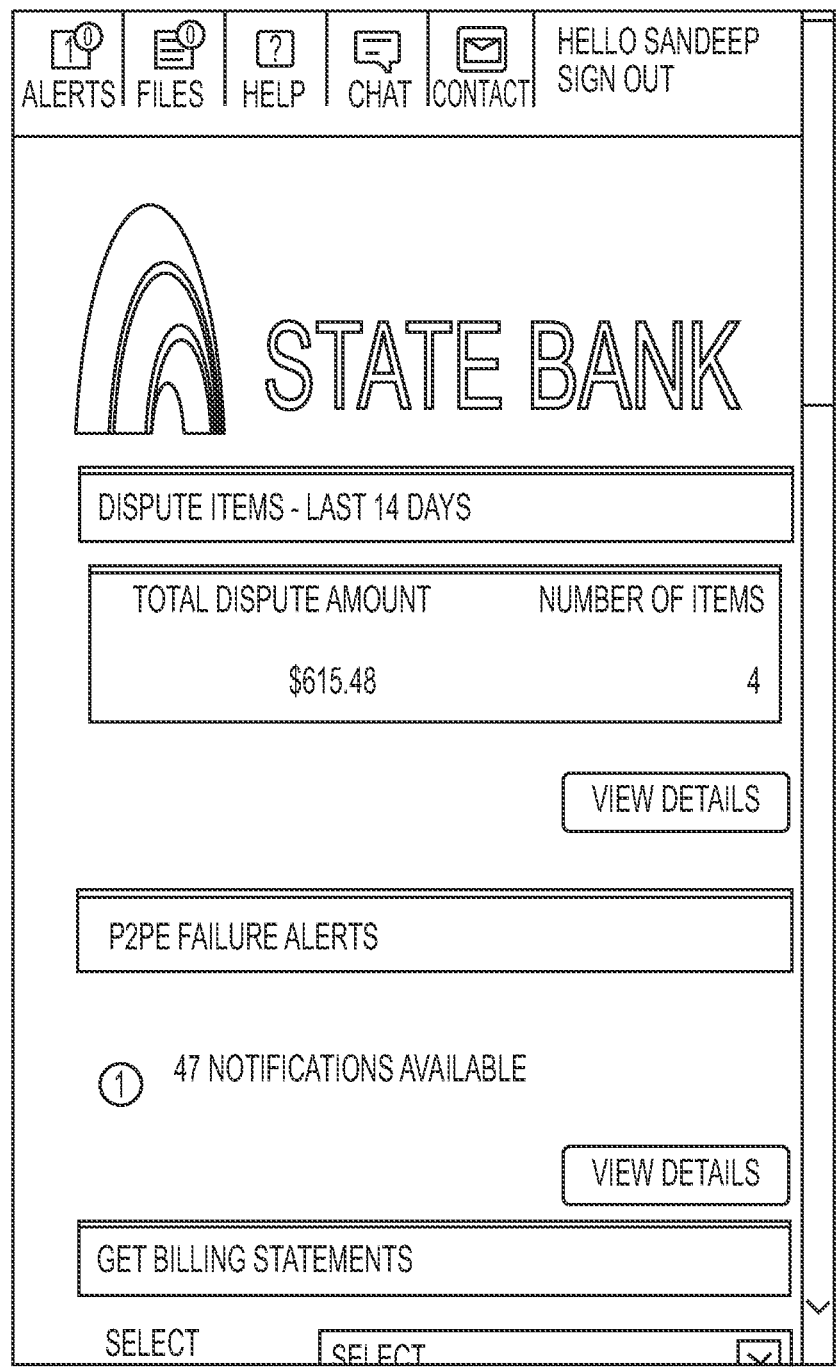
FIG. 5A is a screenshot of an exemplary graphical user interface (GUI) depicting a merchant dashboard in an example system for electronic transaction monitoring and reporting for an exemplary merchant.

FIG. 5A is a screenshot of an exemplary graphical user interface (GUI) depicting a merchant dashboard in an example system for electronic transaction monitoring and reporting for an exemplary merchant. Specifically, the merchant dashboard depicted FIG. 5A indicates a number of P2PE failure alerts available for viewing by the merchant.

FIG. 5B is a screenshot of an exemplary graphical user interface (GUI) depicting service alert search GUI in an example system for electronic transaction monitoring and reporting for an exemplary merchant. The exemplary electronic transaction alert search GUI allows a merchant to select a search criterion, search value, and a date range. A type of failure code may also be specified. However, additional search criteria may be available and the electronic transaction alert search GUI may allow multiple search criteria to be combined in a single search.

FIG. 5C is a screenshot of an exemplary graphical user interface (GUI) depicting a point-to-point encryption (P2PE) failure report for an exemplary merchant. The exemplary P2PE failure report indicates a number of P2PE failures according to the category of the failure and detailed information about each failure. The failure report GUI may allow for the reported columns to be modified by adding or deleting columns or by changing the order of the presented columns. The order of reported P2PE failures may be changed by sorting, such as by sorting preferences specified in a separate dialog (not shown). The P2PE failure search may be refiled through an additional search dialog (not shown). In addition, the data for the reported P2PE failures may be exported to an external format, so as to be incorporated into an external document, such as a word processor document or a spreadsheet.

Figure 6:
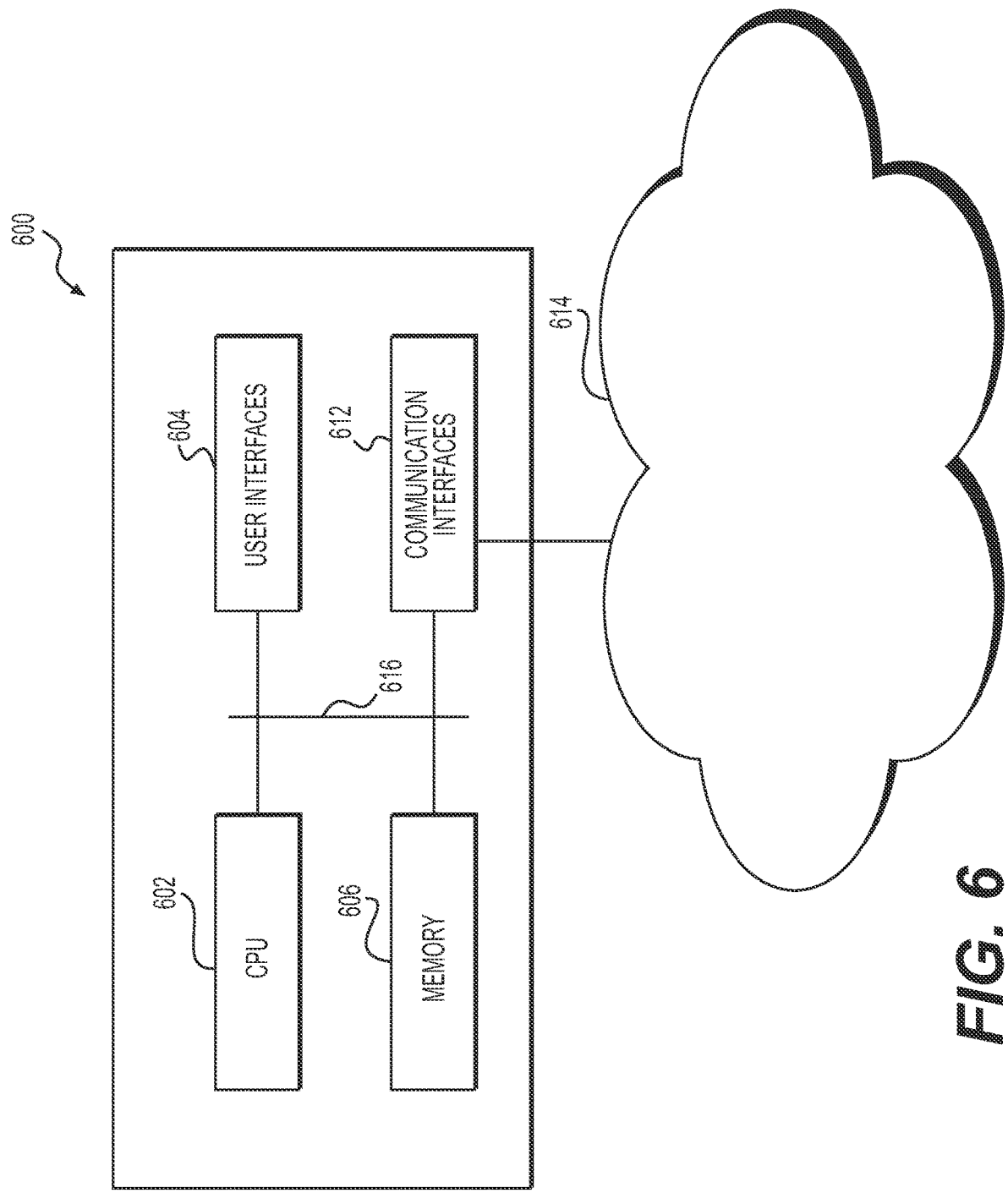
FIG. 6 depicts a computing device for electronic transaction monitoring and reporting, according to one or more embodiments.

The processes described herein may be performed on or between one or more computing devices that are specially configured to perform the processing described herein. Referring now to FIG. 6, an example computing device 600 is presented. A computing device 600 may be, for example, a server, a computing device that is integrated with other systems or subsystems, a mobile computing device, a cloud-based computing capability, and so forth. The computing device 600 can be any suitable computing device as would be understood in the art, including without limitation, for example, a custom chip, an embedded processing device, a tablet computing device, a POS device 118, a payment processing computing system 124, a payment processing computing system 128, a personal data assistant (PDA), a desktop, a laptop, a microcomputer, a minicomputer, a server, a mainframe, or any other suitable programmable device. According to one or more embodiments, a single component can be replaced by multiple components and multiple components can be replaced by a single component to perform a given function or functions. Except where such substitution would not be operative, such substitution is within the intended scope of the one or more embodiments.

The computing device 600 may include a processor 602 that may be any suitable type of processing unit such as, for example, a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources may further include, for example, distributed computing devices, cloud computing resources, and virtual computing resources in general, etc.

The computing device 600 also may include one or more memories 606 such as, for example, read only memory (ROM), random access memory (RAM), cache memory associated with the processor 602, or other memories such as dynamic RAM (DRAM), static ram (SRAM), programmable ROM (PROM), electrically erasable PROM (EEPROM), flash memory, a removable memory card or disk, a solid state drive, and so forth. The computing device 600 also may include storage media such as, for example, a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 602, or memories 606 are also contemplated as storage devices. It can be appreciated that such memory can be internal or external with respect to operation of the disclosed embodiments. It can be appreciated that certain portions of the processes described herein may be performed using instructions stored on a non-transitory computer-readable medium or media that direct a computer system to perform the process steps. Non-transitory computer-readable media, as used herein, comprises all computer-readable media except for transitory, propagating signals.

Network and communication interfaces 612 may be configured to transmit to, or receive data from, other computing devices 600 across a network 614. The network and communication interfaces 612 may be, for example, an Ethernet interface, a radio interface, a Universal Serial Bus (USB) interface, or any other suitable communications interface and can include receivers, transmitter, and transceivers. For purposes of clarity, a transceiver may be referred to as a receiver or a transmitter when referring to only the input or only the output functionality of the transceiver. Example communication interfaces 612 may include, for example, wired data transmission links such as Ethernet and TCP/IP. The communication interfaces 612 may include, for example, wireless protocols for interfacing with private or public networks 614. For example, the network and communication interfaces 612 and protocols may include interfaces for communicating with private wireless networks such as, for example, a Wi-Fi network, one of the IEEE 802.11x family of networks, or another suitable wireless network. The network and communication interfaces 612 may include interfaces and protocols for communicating with public wireless networks 612, using, for example, wireless protocols used by cellular network providers, including Code Division Multiple Access (CDMA) and Global System for Mobile Communications (GSM), etc. A computing device 600 may use network and communication interfaces 612 to communicate with hardware modules such as, for example, a database or data store, or one or more servers or other networked computing resources. Data may be encrypted or protected from unauthorized access.

According to one or more embodiments, the computing device 600 may include a system bus 616 for interconnecting the various components of the computing device 600, or the computing device 600 may be integrated into one or more chips such as, for example, a programmable logic device or an application specific integrated circuit (ASIC), etc. The system bus 616 may include, for example, a memory controller, a local bus, or a peripheral bus for supporting input and output devices 604, and communication interfaces 612, etc. Example input and output devices 604 may include keyboards, keypads, gesture or graphical input devices, motion input devices, touchscreen interfaces, one or more displays, audio units, voice recognition units, vibratory devices, computer mice, and any other suitable user interface.

The processor 602 and memory 606 may include non-volatile memory for storing, for example, computer-readable instructions, data, data structures, program modules, code, microcode, and other software components for storing the computer-readable instructions in non-transitory computer-readable mediums in connection with the other hardware components for carrying out the methodologies described herein. Software components may include, for example, source code, compiled code, interpreted code, executable code, static code, dynamic code, encrypted code, or any other suitable type of code or computer instructions implemented using any suitable methodology including, for example, high-level, low-level, object-oriented, visual, compiled, or interpreted programming language, etc.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the invention being indicated by the following claims.

What is claimed is:

1. A computer-implemented method for validating encryption of electronic transactions using a decryption service system, the method comprising:
    receiving, by the decryption service system, a plurality of transaction requests from one or more point-of-sale (POS) devices associated with a user;
    determining, by the decryption service system, that a first transaction request of the plurality of transaction requests is one of clear data or corrupted;
    in response to determining that the first transaction request of the plurality of transaction requests is one of clear data or corrupted, transmitting, by the decryption service system, a failure alert to the one or more POS devices, the failure alert associated with the first transaction request and including a failure report including a number of point-to-point encryption failures, each point-to-point encryption failure of the number of point-to-point encryption failures categorized by one of malformed message received, clear data received, or invalid card;
    determining, by the decryption service system, that a second transaction request of the plurality of transaction requests is encrypted;
    in response to determining that the second transaction request of the plurality of transaction requests is encrypted, decrypting, by the decryption service system, the second transaction request;
    determining, by the decryption service system, a recipient acquirer processor using decrypted data of the second transaction request;
    re-encrypting, by the decryption service system, the second transaction request using an encryption key associated with the decryption service system; and
    transmitting, by the decryption service system and over an electronic network, the re-encrypted second transaction request to the recipient acquirer processor for payment authorization.

2. The computer-implemented method of claim 1, further comprising:
    receiving, by the decryption service system, a result for the second transaction request from the recipient acquirer processor; and
    transmitting, by the decryption service system, the result for the second transaction request to the one or more POS devices, wherein the result for the second transaction request is encrypted.

3. The computer-implemented method of claim 1, wherein the failure alert is transmitted by way of a reporting portal accessible to the user via the electronic network.

4. The computer-implemented method of claim 1, further comprising:
    assigning, by the decryption service system, a level of severity to the first transaction request based on one or more aspects of the failure alert, wherein the level of severity is higher for transaction requests associated with one of category clear data or category corrupted; and
    determining, by the decryption service system, a reporting frequency for the failure alert based on the assigned level of severity.

5. The computer-implemented method of claim 1, wherein a failure alert report is reported to the one or more POS devices based on a scheduled basis or upon an accumulation of a pre-determined number of failure alerts of a pre-determined severity level.

6. The computer-implemented method of claim 1, wherein a corrupted transaction request indicates a mismatch between the encryption key and a registered decryption key associated with the user.

7. The computer-implemented method of claim 1, wherein a corrupted transaction request indicates a failure in decrypting a transaction request due to one of an error in the transaction request or an internal processing error within the decryption service system.

8. The computer-implemented method of claim 1, further comprising:
    returning, by the decryption service system, the first transaction request to the one or more POS devices associated with the user, wherein payment processing services for the first transaction request is terminated.

9. The computer-implemented method of claim 1, wherein one or more failure alerts are stored in a database, and wherein the failure alert is searched in the database based on a query submitted by the user or other entities having access to reporting data for the user.

10. The computer-implemented method of claim 9, further comprising:
    generating, by the decryption service system, a presentation of a dashboard in a user interface of a device associated with the user for viewing the failure report, wherein the dashboard includes search criterion, search values, date ranges, and failure codes for searching the database for detailed information on point-to-point encryption (P2PE) failures.

11. The computer-implemented method of claim 10, wherein the failure report is exported to an external format for incorporation to an external document.

12. A decryption service system for validating encryption of electronic transactions comprising:
    one or more processors; and at least one non-transitory computer readable medium storing instructions which, when executed by the one or more processors, cause the one or more processors to perform operations comprising:
  receiving, by the decryption service system, a plurality of transaction requests from one or more point-of-sale (POS) devices associated with a user;
  determining, by the decryption service system, that a first transaction request of the plurality of transaction requests is one of clear data or corrupted;
  in response to determining that the first transaction request of the plurality of transaction requests is one of clear data or corrupted, transmitting, by the decryption service system, a failure alert to the one or more POS devices, the failure alert associated with the first transaction request and including a failure report including a number of point-to-point encryption failures, each point-to-point encryption failure of the number of point-to-point encryption failures categorized by one of malformed message received, clear data received, or invalid card;
  determining, by the decryption service system, that a second transaction request of the plurality of transaction requests is encrypted;
  in response to determining that the second transaction request of the plurality of transaction requests is encrypted, decrypting, by the decryption service system, the second transaction request;
  determining, by the decryption service system, a recipient acquirer processor using decrypted data of the second transaction request;
  re-encrypting, by the decryption service system, the second transaction request using an encryption key associated with the decryption service system; and
  transmitting, by the decryption service system and over an electronic network, the re-encrypted second transaction request to the recipient acquirer processor for payment authorization.

13. The decryption service system of claim 12, the operations further comprising:
  receiving, by the decryption service system, a result for the second transaction request from the recipient acquirer processor; and
  transmitting, by the decryption service system, the result for the second transaction request to the one or more POS devices, wherein the result for the second transaction request is encrypted.

14. The decryption service system of claim 12, wherein the failure alert is transmitted by way of a reporting portal accessible to the user via the electronic network.

15. The decryption service system of claim 12, the operations further comprising:
  assigning, by the decryption service system, a level of severity to the first transaction request based on one or more aspects of the failure alert, wherein the level of severity is higher for transaction requests associated with one of category clear data or category corrupted; and
  determining, by the decryption service system, a reporting frequency for the failure alert based on the assigned level of severity.

16. The decryption service system of claim 12, wherein a failure alert report is reported to the one or more POS devices based on a scheduled basis or upon an accumulation of a pre-determined number of failure alerts of a pre-determined severity level.

17. The decryption service system of claim 12, wherein a corrupted transaction request indicates a mismatch between the encryption key and a registered decryption key associated with the user, and wherein the corrupted transaction request indicates a failure in decrypting the corrupted transaction request due to an error in the corrupted transaction request or an internal processing error within the decryption service system.

18. A non-transitory computer readable medium for validating encryption of electronic transactions using a decryption service system, the non-transitory computer readable medium storing instructions which, when executed by one or more processors, cause the one or more processors to perform operations comprising:
  receiving, by the decryption service system, a plurality of transaction requests from one or more point-of-sale (POS) devices associated with a user;
  determining, by the decryption service system, that a first transaction request of the plurality of transaction requests is one of clear data or corrupted;
  in response to determining that the first transaction request of the plurality of transaction requests is one of clear data or corrupted, transmitting, by the decryption service system, a failure alert to the one or more POS devices, the failure alert associated with the first transaction request and including a failure report including a number of point-to-point encryption failures, each point-to-point encryption failure of the number of point-to-point encryption failures categorized by one of malformed message received, clear data received, or invalid card;
  determining, by the decryption service system, that a second transaction request of the plurality of transaction requests is encrypted;
  in response to determining that the second transaction request of the plurality of transaction requests is encrypted, decrypting, by the decryption service system, the second transaction request;
  determining, by the decryption service system, a recipient acquirer processor using decrypted data of the second transaction request;
  re-encrypting, by the decryption service system, the second transaction request using an encryption key associated with the decryption service system; and
  transmitting, by the decryption service system and over an electronic network, the re-encrypted second transaction request to the recipient acquirer processor for payment authorization.

19. The non-transitory computer readable medium of claim 18, further comprising:
  receiving, by the decryption service system, a result for the second transaction request from the recipient acquirer processor; and
  transmitting, by the decryption service system, the result for the second transaction request to the one or more POS devices, wherein the result for the second transaction request is encrypted.

20. The non-transitory computer readable medium of claim 18, wherein the failure alert is transmitted by way of a reporting portal accessible to the user via the electronic network.

* * * * *